(12) United States Patent
Houvener et al.

(10) Patent No.: US 6,202,055 B1
(45) Date of Patent: *Mar. 13, 2001

(54) POSITIVE IDENTIFICATION DISPLAY DEVICE AND SCANNER FOR LOW COST COLLECTION AND DISPLAY OF GRAPHIC AND TEXT DATA IN A SECURE MANNER

(75) Inventors: Robert C. Houvener, Nashua; Ian P. Hoenisch, Salem; Joseph Schappler, Bedford, all of NH (US)

(73) Assignee: Image Data, LLC, Nashua, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/967,768

(22) Filed: Nov. 10, 1997

Related U.S. Application Data

(63) Continuation-in-part of application No. 08/700,815, filed on Aug. 21, 1996, now Pat. No. 5,832,464, which is a continuation-in-part of application No. 08/436,146, filed on May 8, 1998, now Pat. No. 5,657,389.

(51) Int. Cl.[7] .................................................. G06F 17/60
(52) U.S. Cl. ............................................................... 705/44
(58) Field of Search .................................................. 705/44

(56) References Cited

U.S. PATENT DOCUMENTS

| | | | |
|---|---|---|---|
| Re. 35,184 | * 3/1996 | Walker | 364/479 |
| 3,569,619 | 3/1971 | Simjian et al. | 178/6.8 |
| 3,711,833 | 1/1973 | Starkey | 340/149 |
| 4,023,013 | 5/1977 | Kinker | 235/61.7 |
| 4,156,911 | 5/1979 | Crane et al. | 364/419 |
| 4,727,243 | * 2/1988 | Saver | 235/379 |
| 4,858,121 | 8/1989 | Barber et al. | 364/406 |
| 4,991,205 | 2/1991 | Lemelson | 380/5 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,056,141 | 10/1991 | Dyke | 380/25 |

(List continued on next page.)

FOREIGN PATENT DOCUMENTS

WO 86/07480 * 12/1986 (WO).

*Primary Examiner*—Emanuel Todd Voeltz
*Assistant Examiner*—William R. McCarty
(74) *Attorney, Agent, or Firm*—Bourque & Associates, P.A.

(57) ABSTRACT

A system and method for efficiently processing check or other non-cash financial instrument-initiated is disclosed. The method includes the steps of accepting a check from a person initiating a non-cash financial transaction at a point of identification terminal. The checking account number is input into the point of identification terminal and is communicated to a remote database site, having stored therein a database of digital photographic images of authorized users of checking accounts. The database is searched and any digital photographic images associated with the transmitted account number are retrieved and transmitted to the point of identification terminal where they are displaying on a display means and a comparison is made between the images and the physical appearance of the person tendering the check. The person tasked with verifying the identity of the person initiating the transaction inputs identifier specific data into the point of identification terminal to indicate that at least one of the displayed digital images matches the appearance of the person initiating the transaction. The identifier specific data is then transmitted to the remote database site where it is stored, along with the account number and other transaction data as a transaction record.

15 Claims, 12 Drawing Sheets

U.S. PATENT DOCUMENTS

| | | | |
|---|---|---|---|
| 5,095,196 | 3/1992 | Miyata | 235/382 |
| 5,131,038 | 7/1992 | Puhl et al. | 380/23 |
| 5,180,901 | 1/1993 | Hiramatsu | 235/380 |
| 5,224,173 | 6/1993 | Kuhns et al. | 382/2 |
| 5,259,025 | 11/1993 | Monroe et al. | 380/23 |
| 5,305,196 * | 4/1994 | Deaton et al. | 364/401 |
| 5,321,751 | 6/1994 | Ray et al. | 380/23 |
| 5,337,358 | 8/1994 | Axelrod et al. | 380/23 |
| 5,367,572 | 11/1994 | Weiss | 380/23 |
| 5,416,306 | 5/1995 | Imahata | 235/380 |
| 5,436,970 | 7/1995 | Ray et al. | 380/23 |
| 5,466,918 | 11/1995 | Ray et al. | 235/380 |
| 5,648,648 | 7/1997 | Chou et al. | 235/382 |
| 5,712,483 * | 1/1998 | Boone et al. | 250/367 |
| 5,790,674 | 8/1998 | Houvener et al. | 380/23 |
| 5,832,464 * | 11/1998 | Houvener et al. | 705/45 |
| 5,870,723 * | 2/1999 | Pare, Jr. et al. | 705/39 |
| 5,903,225 | 5/1999 | Schmitt et al. | 340/825.31 |
| 5,965,859 | 10/1999 | DiVincenzo et al. | 235/380 |

* cited by examiner

POSITIVE IDENTIFICATION DISPLAY DEVICE AND SCANNER FOR LOW COST COLLECTION AND DISPLAY OF GRAPHIC AND TEXT DATA IN A SECURE MANNER

RELATED APPLICATIONS

This is a Continuation-in-Part of application Ser. No. 08/700,815, filed Aug. 21, 1996, now U.S. Pat. No. 5,832,464 issued Nov. 3, 1998, which is a Continuation-in-Part of application Ser. No. 08/436,146, filed May 8, 1998 now U.S. Pat. No. 5,657,389, issued Aug. 12, 1997.

FIELD OF THE INVENTION

The present invention relates to the field of identity and verification. Specifically, the invention is directed to a device and method for facilitating the low cost collection and display of graphic and text data for identity verification purposes in a secure manner, which includes a display device and scanner.

BACKGROUND OF THE INVENTION

Positive identity verification is critical in many types of transactions and security procedures. For example, signatures, fingerprints or images of faces are compared to establish identity. Creation of fraudulent identities or the misrepresentation of an individual's identity can result in fraudulent transactions and the breach of security systems. At present, positive identification means such as driver's licenses, picture identification cards, hand-written signatures, personal identification numbers, fingerprints, retinal scans, voice prints and other ways of uniquely identifying personal characteristics are used. However, these prior art methods of identity verification exhibit one or more of the following deficiencies: 1) they do not offer sufficient reliability for most positive identification applications; 2) the technology required for their implementation is too expensive for wholesale adoption by entire industries; 3) they do not offer ease of use, which is critical for most applications of the personal identification system; 4) the technology required to implement them in a wide-scale manner is not yet mature enough to guarantee sufficient reliability; 5) the recurring cost of using technology is too high for most applications of personal identification; 6) the data used for identity verification is not maintained in a secure manner and is almost universally held by the person presenting it as the form of verification, thereby allowing for fraudulent alteration of the verification data; 7) processes for building accurate verification databases for wide-spread use are impractical; and 8) the process of verification does not include sufficient steps to ensure that the individual responsible for identity verification is accountable to ensure that identity verification is accurately performed.

Transactions that rely on positive identity verification include credit/debit and charge card payments and check or other non-cash financial instrument-based transactions, such as purchase using food stamps. Credit cards are an increasingly popular means for consumers to complete transactions. However, part of the costs incurred from the convenience of using credit cards, checks and other non-cash financial instruments is the burgeoning growth of credit card and check fraud. Because there are trillions of dollars of credit card and check-based transactions made each year, which depend on the fact that the person presenting the form of payment is actually the person having the legal right to use the underlying account, even a small percentage of fraudulent transactions results in billions of lost dollars. The cost of this fraud is paid for, indirectly, by the consumers in the form of higher prices, higher credit card interest rates and fees and, in part, by merchants accepting such credit cards in the form of higher transaction commissions.

Methods used to combat fraud have been the use of holographic images on cards, the need for a validation requester to obtain transaction approval, the encoding of cardholder information on magnetic strips on the back of the card, as well as signature verification. A number of patents have issued on identification devices and methods. Of particular note is U.S. Pat. No. 5,321,751, issued to Ray, et al. on Jun. 14, 1994. Other prior art references of note are U.S. Pat. No. 5,337,358, issued to Axelrod, et al. on Aug. 9, 1994, U.S. Pat. No. 5,095,196, issued to Miyata on Mar. 10, 1992, U.S. Pat. No. 5,259,025, issued to Monroe, et al. on Nov. 2, 1993, U.S. Pat. No. 4,995,081, issued to Leighton, et al. on Feb. 19, 1991, U.S. Pat. No. 4,991,205, issued to Lemelson on Feb. 5, 1991, U.S. Pat. No. 5,053,608, issued to Senanayake on Oct. 1, 1991, U.S. Pat. No. 5,131,038, issued to Puhl, et al. on Jul. 14, 1992 and U.S. Pat. No. 4,993,068, issued to Piosenka, et al. on Feb. 12, 1991. As noted above, one of the underlying deficiencies of all of these prior art identification systems is that they all rely, in some manner, on information encoded on the credit card being presented. While some of these references include sophisticated encryption algorithms, the fact remains that giving access to the information to the card users lends itself to the potential for reverse engineering and overcoming even the most sophisticated of encryption means.

In the recent past, Citibank introduced a credit card with a digital likeness of the authorized user provided on the card itself. As the Ray patent discloses, the photographic image on the Citibank card resulted in an initial drop in fraud in the new York test market estimated as high as 67 percent. However, as Ray also explains, the Citibank photo card system, like other forms of identity verification, which are distributed to the public, will eventually be defeated by sophisticated counterfeiting.

An additional difficulty with most prior art verification methods is that they all require the use of a special credit card incorporating some form of identification means. Thus, in order for their use to gain widespread acceptance, replacement of existing credit cards and credit manufacturing equipment must be accomplished.

The disclosed invention offers a number of advances over prior art identity verification systems and methods, which overcome many of the limitations found in such prior art systems.

The first, and perhaps most significant advantage of the disclosed invention is that the positive identity verification system stores the verification data at a remote site and thereby does not give criminals access to the identity verification medium. This is significant in that any time a potential counterfeiter is afforded the opportunity to access the verification medium, there is the potential that the medium can be corrupted, regardless of the level of security sophistication incorporated into the system. A second, and again significant advantage of the disclosed invention, is that the system is completely independent of the credit cards or checks whose users the system is designed to positively identify. Thus, the disclosed invention does not require the modification or replacement of existing credit cards, which would be an almost insurmountable task. Furthermore, the segregation of the identity verification medium from the credit cards themselves allows the system disclosed herein to be used in conjunction with any number of credit cards.

SUMMARY OF THE INVENTION

In accordance with the present invention, a system and method for efficiently processing check or other non-cash financial instrument-initiated transactions is provided. The method includes the steps of accepting a check or other non-cash financial instrument from a person initiating a non-cash financial transaction at a point of sale having a point of identification terminal. The account number, which represents the account from which funds required to complete the financial transaction will be drawn, is input into the point of identification terminal and communications are established between the terminal and a remote database site. The remote database site has stored therein a database of digital photographic images of authorized users of checking and other accounts. Once communications are established, the point of identification terminal transmits the input account number to the remote database site, where the database is searched and any digital photographic images associated with the transmitted account number are retrieved and transmitted to the point of identification terminal where they are displaying on a display means. The person tasked with verifying the identity of the person initiating the transaction would then compare the displayed images with the physical appearance of the person initiating the financial transaction and input identifier specific data into the point of identification terminal to indicate that at least one of the displayed digital images matches the appearance of the person initiating the transaction. The identifier specific data is then transmitted to the remote database site where it is stored, along with the account number and other transaction data as a transaction record. If no images are retrieved from the remote database, then a request to input identifying information is transmitted to the point of identification terminal. The identifier would then accept identifying information from the person initiating the transaction and input the same, along with identifier specific data into the point of identification terminal. This information along with other data related to the specific transaction is then transmitted to the remote database site and is stored as a transaction record, which may be recalled at a later date should a transaction be questioned.

The device and method may be used to facilitate signature-less financial transactions as an improvement over common, prior art check-based financial transactions. This system and method provides the ability to use a check as a form of payment and a point of use without having to use the signed check as the binding document that is processed through the financial system to obtain payment by the entity rendering the service. The system and method also allows for the wholesale scanning of a drivers license or other identification card and those items of interest on the card can be separated out and stored for later retrieval. Thus, this system and method reduces the time to process a patron at a point of identification and provides a process by which a database of identity information and associated account number information can be built for use in mass use identity verification systems. Once a particular financial transaction is authorized, the check is returned to the tenderer and the financial transaction is processed as an electronic fund transfer (EFT).

DESCRIPTION OF THE DRAWINGS

These and other features and advantages of the present invention will be better understood by reading the following detailed description, taken together with the drawings wherein:

FIG. 2 is a perspective view of the preferred embodiment of the point of identification terminal, which would be available for use at a point of sale or the like.

DETAILED DESCRIPTION OF THE PREFERRED EMBODIMENT

Figure 1:
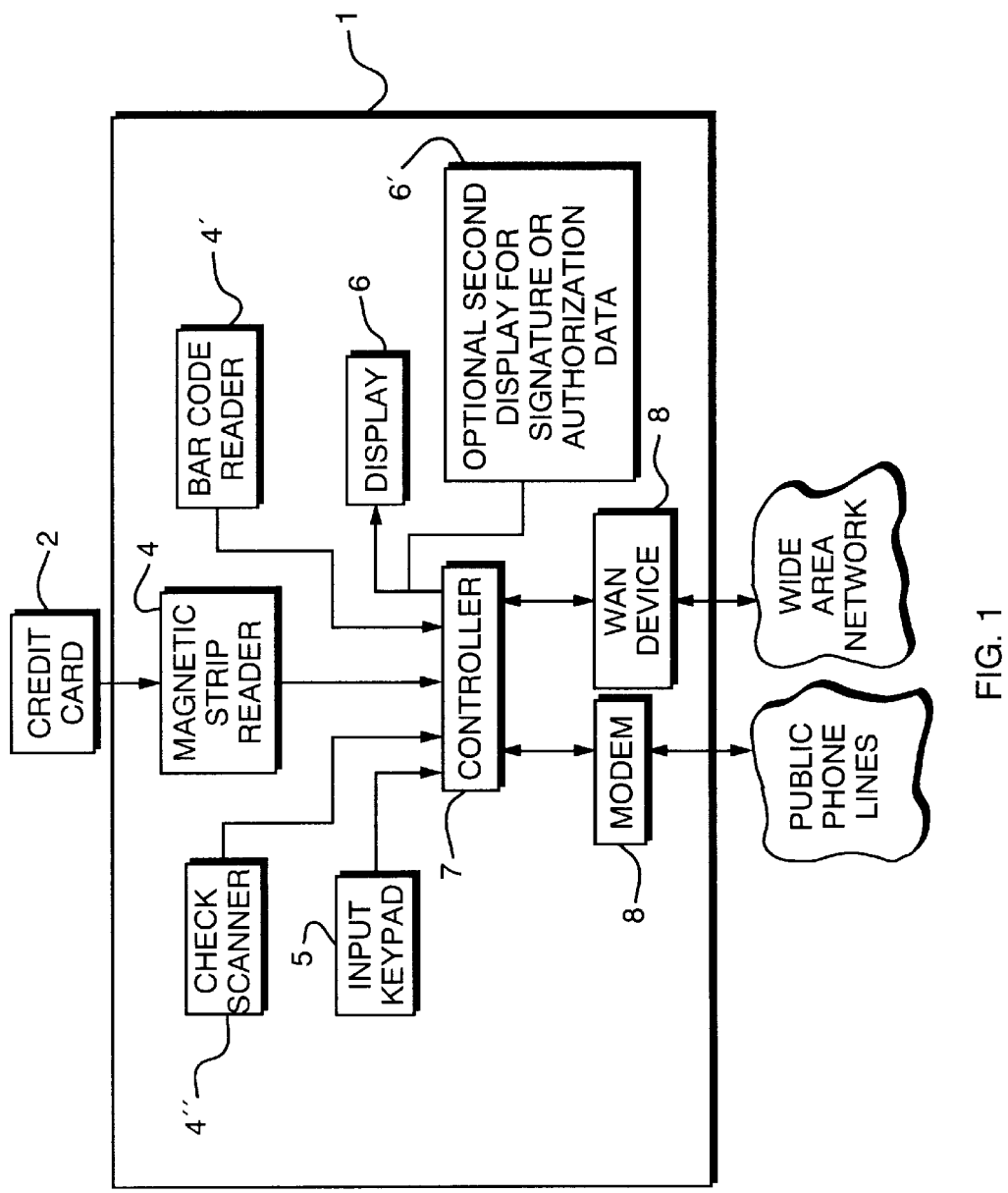
FIG. 1 is a block diagram of the point of identification terminal showing the various components contained therein.
Figure 2:
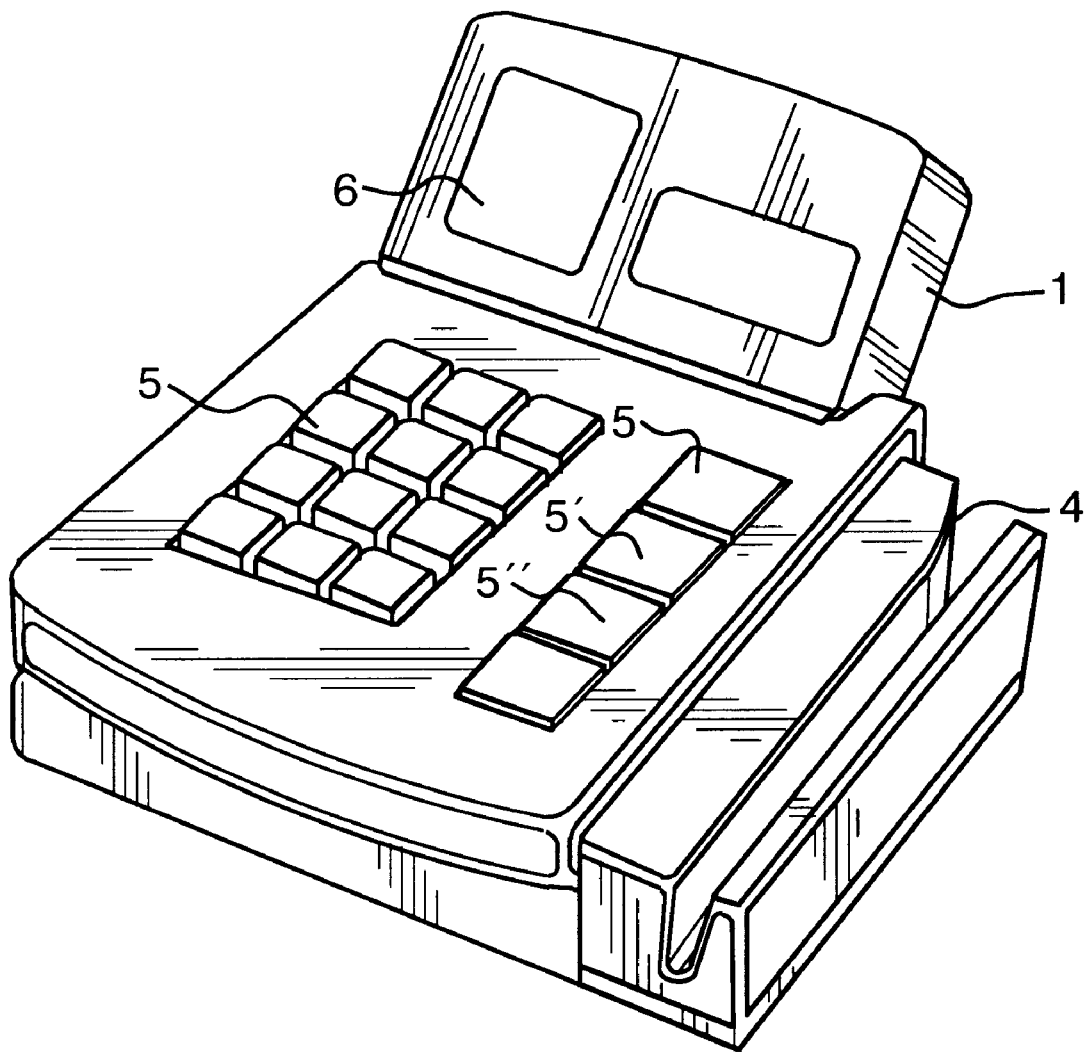
Figure 3:
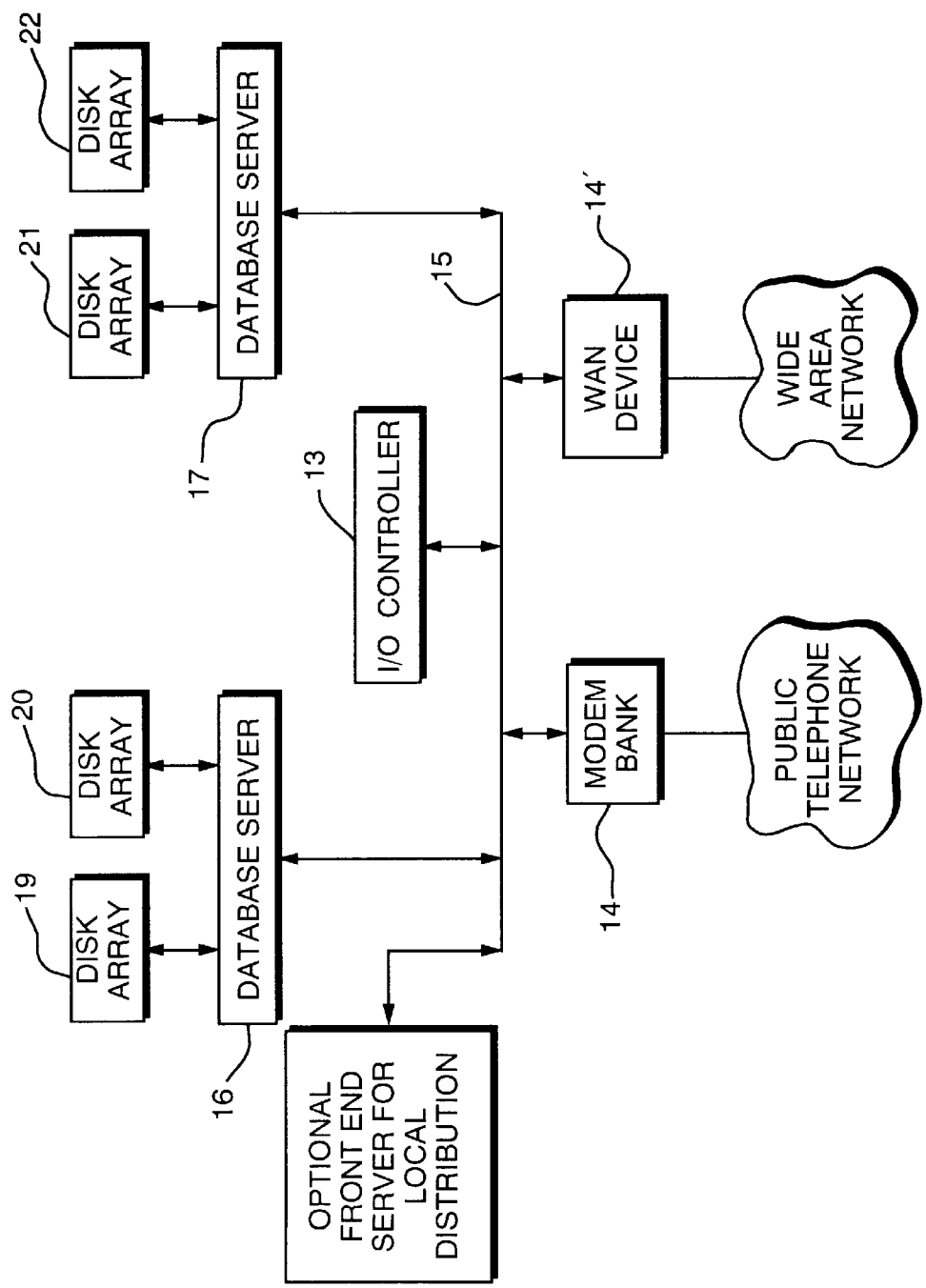
FIG. 3 is a block diagram of components of the positive identification system and the communication flow path established between the point of identification and the remote database storage and retrieval center, which is where a comprehensive database of photographic images of persons to be identified is maintained and accessed for transmission to the point of verification.
Figure 4:
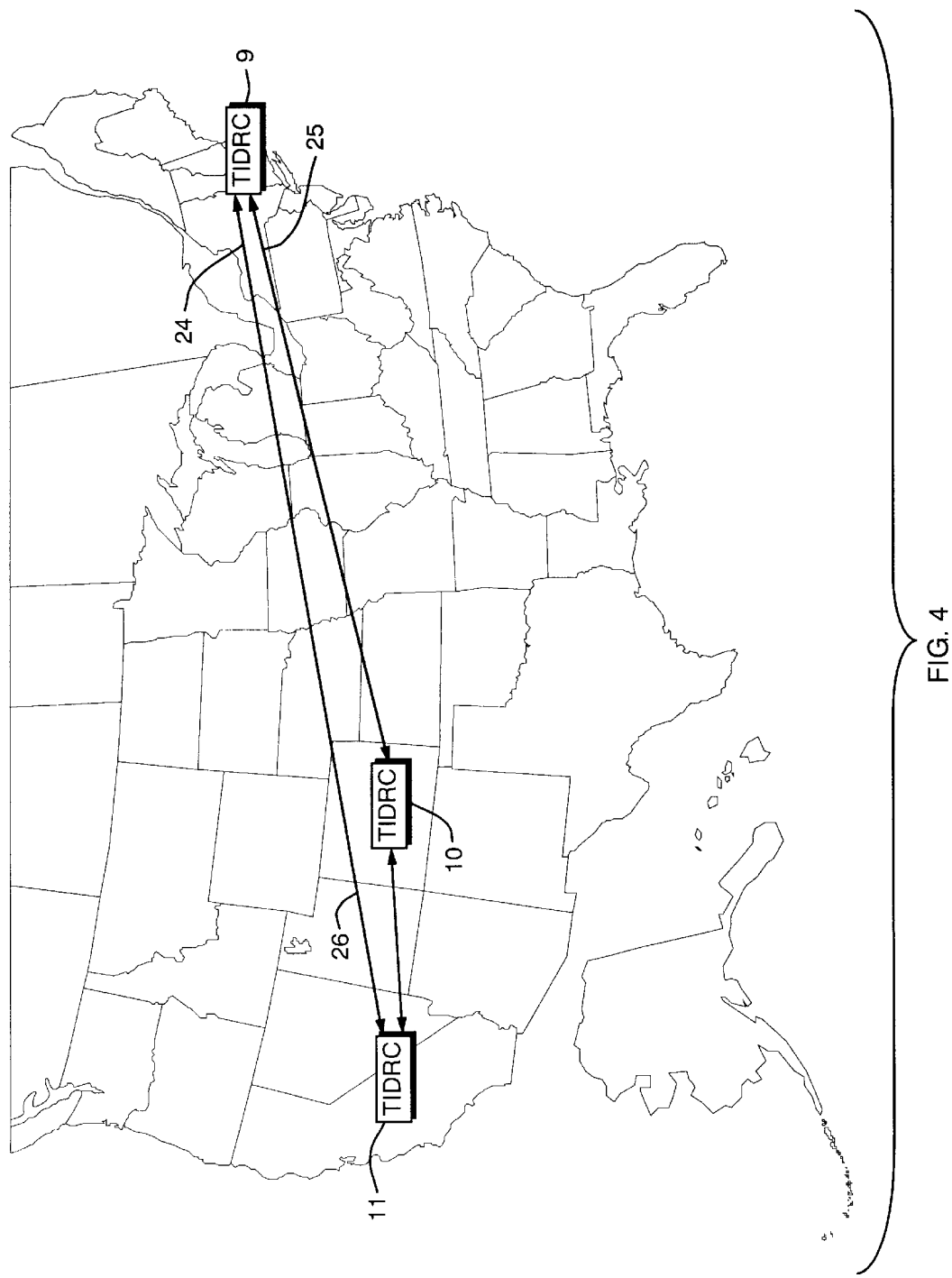
FIG. 4 is an upper level system architecture drawing showing a number of database storage and retrieval centers networked over a global high speed network.

The present invention is a system and method to develop, maintain and use a secure and authentic database of digital photographic image, signature or other data unique to individuals for positive identity verification purposes. The system includes a means for accessing the database in a secure and cost-effective manner, a means for performing positive identity verification, and a distributed database update and retrieval system, which allows for low cost operation, ease of use, stability and robustness for vast numbers of verification requests originating from worldwide locations. The present invention also includes a means that allows for accountability on the part of a user of the system, which in turn will ensure that the system is used to its fullest potential.

One such system that will be disclosed herein contains particular references to a point of sale system, where a check is presented by a consumer, or presenter, in order to make a purchase. Thus, the system will make particular references to checking account numbers. However, it is understood that the positive identity verification system disclosed herein is adaptable to any application where positive identification of a person is required. Such alternative applications comprise other banking transactions, firearm sales, food stamp reimbursement and a host of other applications related to the welfare, voting, law enforcement, health care, airline, immigration and naturalization fields.

Referring now to the figures, a positive identification system in accordance with the disclosed invention is shown. A point of identification terminal 1 is located at a location where the identity of persons present is required to be verified. The point of identification terminal comprises a standard magnetic strip reader 4, an optional bar code reader 4', a check scanner 4", all of which are well know in the art, an input keypad 5, a display means 6, which is preferably a miniature flat panel display, a controller 7, and an internal communication modem or other communications means 8. The rate of data exchange may vary depending on the availability of quality phone lines or other means of data transmission, such as a dedicated wide area network, a satellite communications link or other wireless communications link, such as cellular telephone communications or the like.

In a credit card transactional situation, the point of identification would be the point of sale, which typically incorporates a cash register and prior art credit card verification systems. Upon presentation of a standard credit card 2, the store clerk or other individual responsible for positive identification would input the credit card account number into the point of identification terminal 1. The standard method of inputting the credit card information would by swiping the credit card through the standard magnetic strip reader 4, which would be capable of reading credit card account information, which is currently encoded on magnetic strips on the reverse side of virtually all credit cards. In the alternative, if the magnetic strip containing the account data is corrupted, which routinely occurs due to either wear or contact with a powerful magnetic field, the identifier would simply read the account number off of the credit card, where it is typically provided in embossed characters, and input the credit card account number into the point of identification terminal using keypad 5. Another alternate means of inputting the credit card account information into the point of identification terminal would be to utilize a coded medium such as a bar code. In this embodiment, the magnetic strip reader 4 would be replaced by a standard bar code reader 4' to transfer its data to the bar code reader 4' and to controller 7. Another embodiment of the invention would include check scanner 4", which would be used to scan checking account number information off of a standard personal or company check, which would expand the role of the system from credit/debit card transaction identity verification to checking related transactions as well.

In addition to the credit card account information, the identifier could manually input any other information needed to aide in the identity verification process via keypad 5. Such additional information could be whether the presenter is male or female, in which case the keypad could incorporate a specific key to correspond to the male - female choice 5' or whether the presenter is a dependent of the credit card owner, in which case the keypad would incorporate a specific key 5" to correspond to dependent choice. Alternatively, a simple scroll key (not shown) could replace keys 5' and 5" and would allow an identifier to simply scroll through the available photographs.

Once the account number is entered into the point of identification terminal 1, the terminal would initiate communications via its internal communication means, which could be a modem or wide area network (WAN) device to one of a number of remote database storage sites 9–11 using public phone lines 12. Alternative forms of communications links are envisioned as well, and include secure or unsecure cellular communications, satellite communications or dedicated networks. The actual site accessed would be a function of availability and loading on the public access phone lines, network availability, retrieval site availability or other system availability criteria at the time the terminal initiates communications with a remote database site. Communications will then be established with an input/output controller 13 at the remote database storage site through a modem bank 14 at the database storage site. The controller 13 would initiate a query to the point of identification terminal 1 to verify that the terminal has the appropriate authority to access the remote database site and is a valid device. One simple and cost effective method of performing this query is to use commonly available caller ID technology to ensure that the request for data has originated from an authorized telephone line. Additionally, a software key may be incorporated into each point of identification terminal, which will respond in a predetermined manner when queried by a remote database storage site.

Once controller 13 verifies that the requesting point of identification terminal 1 is a valid device and has the appropriate access privilege, the terminal will be allowed to transmit an information request to the database storage site. The information request is also received by input/output controller 14, over a high speed network 15. The high speed network may be fiber distributed data interface (FDDI), asynchronous transfer mode (ATM) or any other suitable cost effective high speed network. The information request is then routed to one of a number of database servers 16–17 where the credit card account data is processed. The selected server then accesses a set of high speed, high reliability disk arrays 19–22 and retrieves the digital photographic or other image or other unique personal data associated with the account data received by the database server. In addition to retrieving the digital image or other unique personal data stored at the remote database site, the database site would be configured to allow input/output controller 13 to initiate additional information requests from outside information databases. One such scenario envisioned in the credit card processing example would be for the database site to query any one of a number of existing credit authorization agencies (CAA) to verify that the credit card account being processed is valid and within its pre-approved credit limit. An alternate embodiment would be to have the remote database storage and retrieval site(s) co-located at a one or more CAA sites.

The identifier, which would be the sales clerk in a retail establishment, would only need to input the credit card information into one device and would receive both credit approval and identity verification from a single source. In this scenario, input/output controller 13 would initiate a credit authorization request to an outside CAA 23 through modem bank 14 over public access telephone lines 12 or through a WAN connection 14' or the like. If the amount of the transaction is approved by the CAA 23, the database site would receive the credit approval code from the CAA and retransmit the code to the point of identification terminal along with the digital image information or other unique data over its established communications link. The credit approval code would be displayed either on the display means 6 of the point of identification terminal or, in the alternative, on an optional second display means 6'.

The point of identification terminal 1 would then receive the information via modem 8 or WAN connection 14' and route it to controller 7, which would process the information received and display the digital image received on either display means 6. In one embodiment of the invention, the digital information would be stored at the remote database storage site in a compressed state and be transmitted to the point of identification terminal in the compressed state so as to minimize the time associated with a particular transaction. In this embodiment, the controller 7 would first decompress the digital photographic information and then display the information on display means 6.

Another embodiment of the invention, which would be used for situations where the highest security of information would be required, the digital image information would be encrypted in addition to being compressed while it is being transmitted to a point of identification terminal. In this embodiment, the terminal controller 7 would be required to decrypt as well as decompress the photographic information in order to allow the information to be displayed on the display means.

In an embodiment of the invention, which includes encryption and/or compression capabilities, the system would include the ability to remotely reconfigure either or both the compression/decompression and encryption/decryption methodologies utilized by the system. The ability to remotely reconfigure these capabilities would greatly reduce the maintenance costs of the deployed devices, increase the life of the devices by allowing new encryption and compression techniques to be loaded and increase the security of the system by allowing changes to encryption strategies as conditions demand. Reconfiguration would be accomplished at any time a point of identification terminal initiates communications with the remote database site. Upon the initiation of communications with the remote database site, in addition to the other security checks mentioned above, the database site would perform a compression/encryption verification routine. These routines would verify that the most recent encryption and compression strategies are being utilized by the point of identification terminal. The database site will also maintain a history log of updates and/or changes to both the encryption and compression technologies, which may be searched and analyzed to identify any potential tampering with the system at any point of identification terminal.

Provided a point of identification terminal passes its initial security checks, the remote database will then be capable of remotely reconfiguring both the encryption and compression technologies utilized. Changes or updates to encryption and compression technologies could be performed on a scheduled basis, could be performed on a random basis, or could be performed whenever the veracity of the system comes into question.

In any event, due to the rapid advances in both encryption and compression technologies, it is very important that the device has the capability to take advantage of the new technologies without having to send an electronic technician physically to each point of identification terminal in order to reconfigure the terminal. The disclosed system, by including the ability to remotely reconfigure the compression and/or encryption technologies, provides a cost effective means for providing the highest level of security.

In any event, once communications are established and an image or series of images are transmitted to the point of identification terminal in response to the receipt, at the remote database site, of an account number, the store clerk, or other person responsible for identity verification would visually compare the image displayed on the display means with the physical appearance of the person presenting the credit card at the point of identification. If a match exists, then the clerk would input a specified keystroke sequence on input keypad 5 to indicate that the clerk has in fact verified that an identity match exists. The keystroke sequence would be unique to an individual clerk much like a personal identification number (PIN). The individual PIN would then be transmitted by the point of identification terminal via the communications link to the remote database storage and retrieval site, where the PIN would be associated with the particular transaction being completed and stored for retrieval at a later date should a dispute arise as to whether or not a particular credit card transaction was properly authorized. Thus, the use of a PIN-type system associated with each store clerk would provide accountability and result in a higher level of scrutiny than a system that does not incorporate any features to ensure personal accountability.

Other features that could be added to the basic system include the addition of signature verification capability. Because signatures, as well as photographs, can be digitized and transmitted over a standard communications medium, signature verification would be a natural extension of the basic system. In this embodiment, digital, graphical representation of a signature would be transmitted to the point of identification terminal from the remote database site at the same time the photographic data is transmitted. In this embodiment, the identifier would be able to display either the photographic image of the presenter or the presenter's digital signature on the display means 6 in order to verify either one or both forms of digital information. In an alternate embodiment, second display means 6' would be used to display an authorized digitized signature at the same time a photographic image of an authorized user is displayed on display means 6. This additional feature would allow participants of the system to maintain signatureless credit cards. Thus, if a criminal were to obtain a credit card, the card would have no signature for the criminal to study and possibly learn to forge. This would add an additional level of security to the system, not found in the basic system.

In another embodiment of the invention, a retrofit terminal is used to add positive identity verification to existing point of sale credit card authorization devices and systems. The retrofit terminal is designed to work in conjunction with existing point of sale devices without the necessity of replacing currently existing retail establishment hardware systems. The retrofit terminal is added at the existing point of sale and consists of a modified controller, a display means, and a communications interface. Preferably, the display means is a miniature flat panel display, similar to the type used in the point of identification terminal 1 described above. The display 6 can be located on available counter space or, if space is at a premium, it can be mounted on a pedestal or the like. The retrofit terminal would be connected to a standard power source and to the existing credit card authorization hardware via its internal serial or parallel communications interface.

Instead of accepting the credit card account information from either a magnetic strip reader 4, a bar code reader 4', or a manual keypad 5, as is the case with the standard point of identification terminal 1, the retrofit terminal would accept the credit card account information from installed point of sale or credit card authorization hardware via a communications interface. The retrofit terminal would then initiate communications to a remote database site in the same manner described earlier in order to retrieve and display identifying data, such as digitized photographs of the authorized credit card users. However, unlike the standard point of identification terminal, identifier accountability would have to be provided using inputs entered by the identifier on the existing credit card authorization hardware, or through the input of an access authority information unit, such as a unique memorized or electronic key implemented PIN through the retrofit terminal. In addition, the retrofit terminal could be configured to display a biometric identifier of each identifier authorized to access the remote database, which would itself be verified by a supervisor or the like upon initial sign on to the system by an identifier. The retrofit terminal would then forward the identifier specific information to the remote database site for storage. The retrofit terminal could also include an optional check scanner, identification card scanner or an optional bar code reader to allow for flexibility of use with other forms of payment such as personal or company checks or the like, which will be discussed in more detail below.

Thus, the retrofit terminal would greatly reduce the cost per verification site, would simplify the installation of hardware at each verification site, and would increase the viability and acceptability of the novel positive identification system.

Multiple remote database storage and retrieval centers would be tied together via a global high speed network 24–26. Data from any of the database centers can be routed to any of the other centers over the network in order to update the databases, provide redundancy of data, emergency backup, load monitoring and transactional balancing.

Because the disclosed invention can be used without alteration of any substantial kind to the present credit card system, as seen from the perspective of a current credit card user, novel methods will be used to develop the digital photographic image database. Such novel methods of developing the image database are further described in U.S. Pat. No. 5,657,389, issued on Aug. 12, 1997, and assigned to the assignee of the present invention and incorporated herein by reference.

Figure 5:
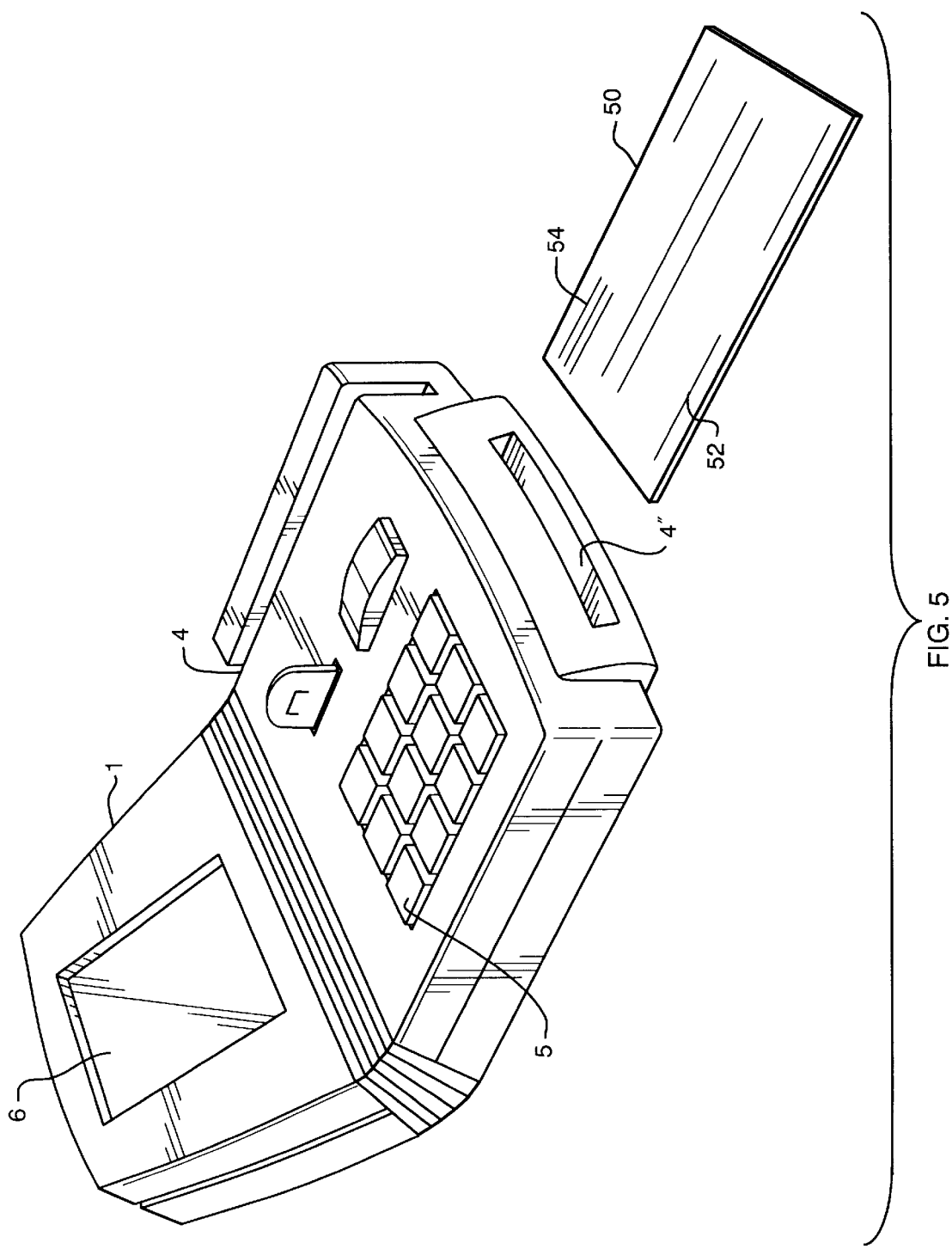
FIG. 5 is a perspective view of one preferred embodiment of a point of identification terminal, which is especially configured to read data off of checks and convert the same into a check-less electronic fund transfer (EFT) transaction.

Another embodiment of the invention comprises a system and method of efficiently processing non cash-based financial transactions such as check or other non-cash financial instrument-initiated transactions. Turning now to FIG. 5, this embodiment requires the use of a point of identification terminal 1, which includes document scanner 4". The system would operate much like that described above for individual financial transactions using credit cards, except that a personal or company check 50 would be tendered at a point of sale as the method of payment. When a check is tendered as the method of payment, the store clerk would process the check by inserting it into scanner 4" of point of identification terminal 1. Check scanner 4" would read the account data 52 off of the check 50, which is included on all valid checks in a standardized format, including standard character types and placement. In addition to reading the account number, check scanner 4" would also scan any personal data 54 off of the check. Such personal data is generally presented in the upper left hand corner of checks. Although this data may be presented in varying formats, including different fonts, sizes or order of data, standard optical character recognition (OCR) techniques would be utilized by the point of identification terminal in order to allow for these types of variations to be acceptable to the system.

Figure 10:
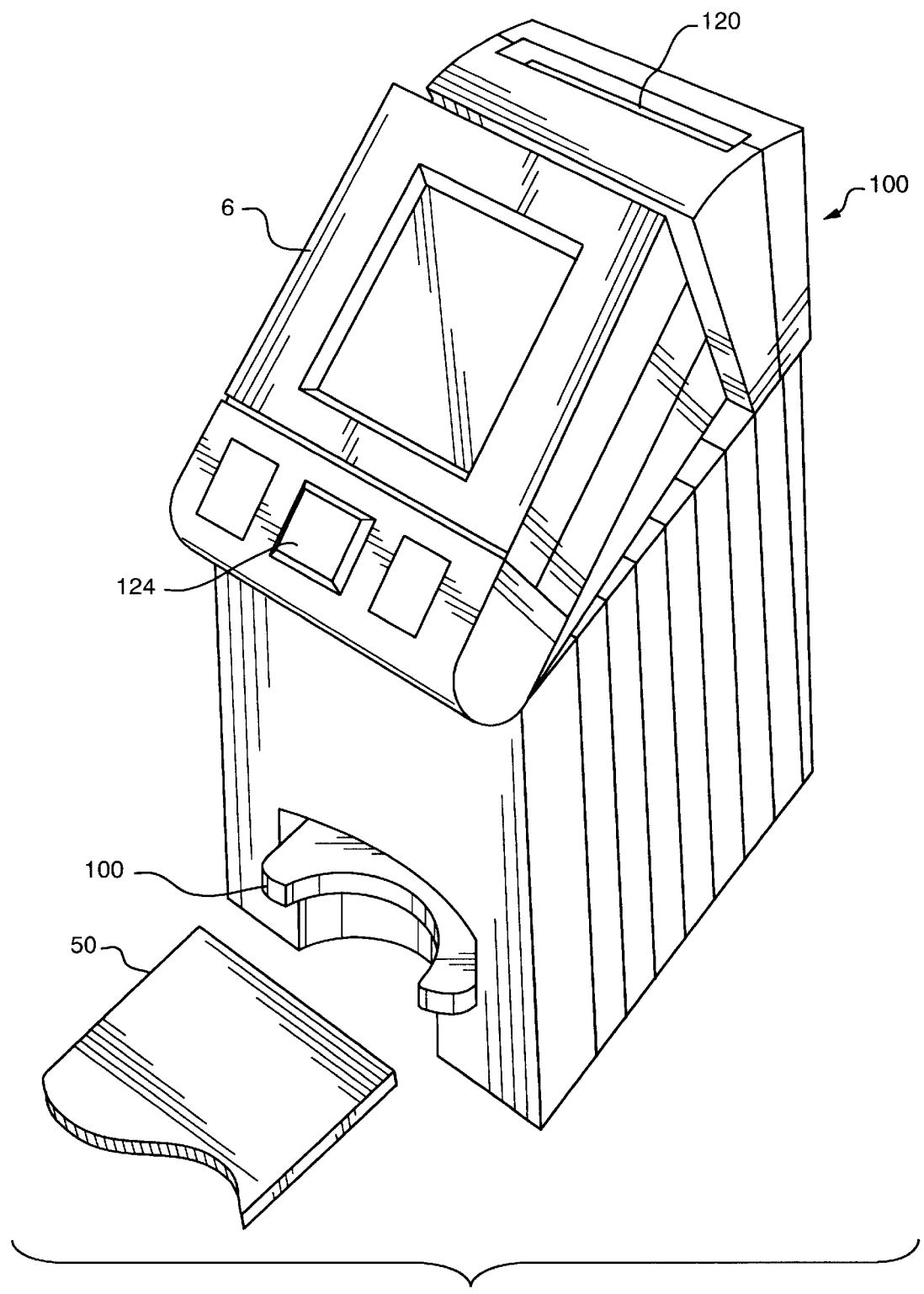
FIG. 10 is a perspective view of a second embodiment of a point of identification terminal, which is especially configured to read data off of checks, driver's licenses or other instruments and to transmit the same to a secure, remote database.
Figure 11:
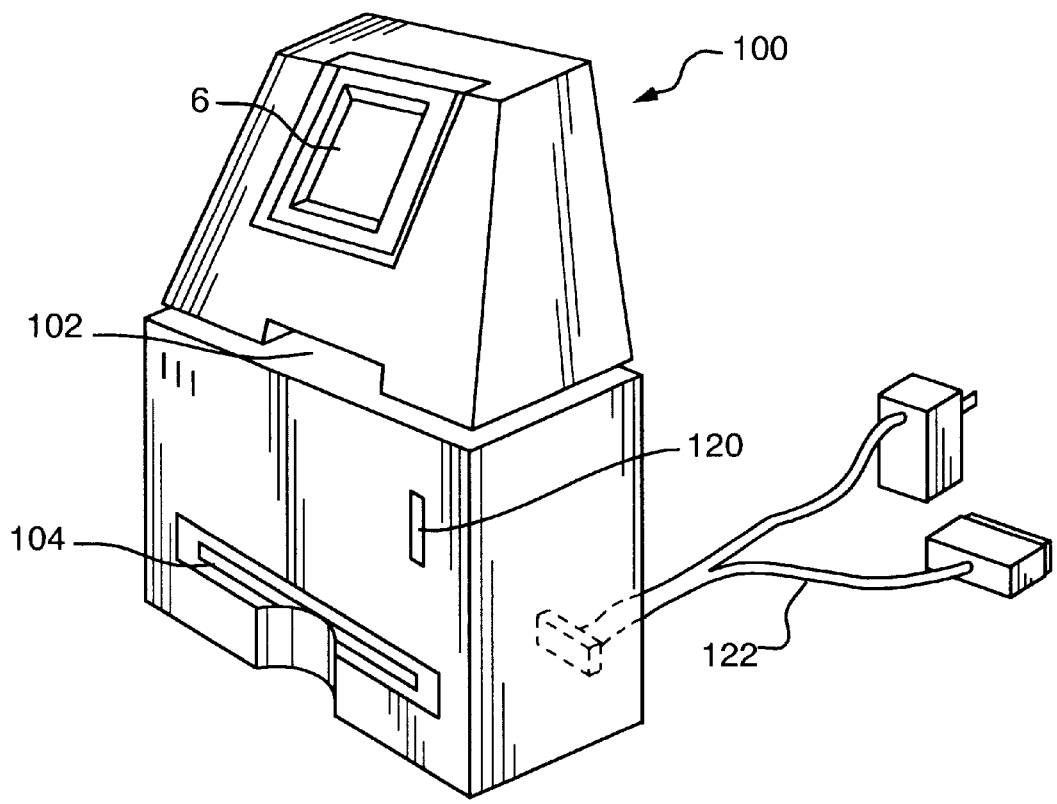
FIG. 11 is a perspective view of another embodiment of a point of identification terminal, which incorporates multiple data recovery inputs to read data off of checks, driver's licenses or other financial or identification instruments.
Figure 12:
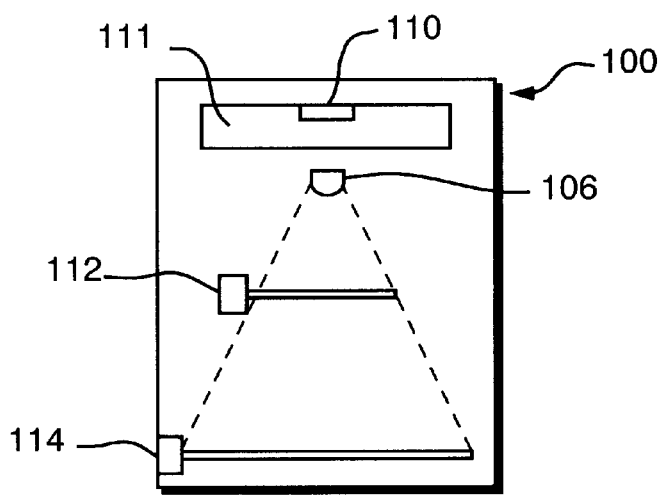
FIG. 12 is a cutaway front view of the point of identification terminal of FIG. 11.
Figure 13:
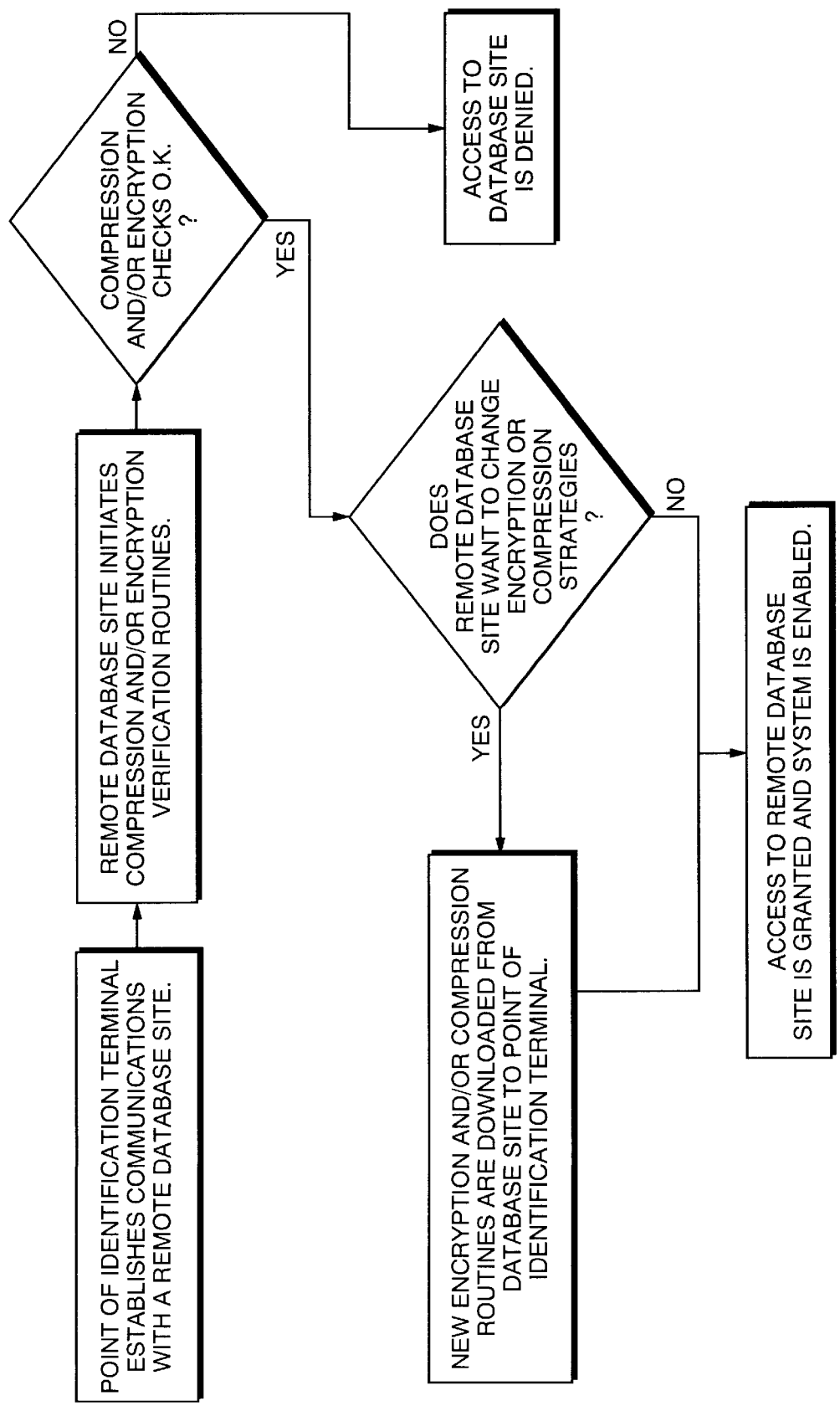
FIG. 13 is a block diagram showing the steps of a method of remotely reconfiguring compression/decompression and encryption/decryption capabilities of the disclosed positive identification system.

More robust embodiments of the invention are shown in FIGS. 10, 11 and 12. These embodiments include a scanner 100, which can not only read character-based data of a check 50 but can capture image data as well. While the invention contemplates the use of any technology capable of capturing both image and textual data, such as standard charge coupled device (CCD) image capture devices or linear CCD devices, which would require that the document be mechanically passed by the device, the preferred embodiment of the invention utilizes a high resolution, low cost complimentary metal oxide semiconductor (CMOS) camera 110 on a printed circuit board 111 to capture the image or images. In this manner, a "snapshot" can be taken of a check, a driver's license, a passport, an identification card, or any other instrument inserted into one or more scanner inputs of the point of identification terminal. FIG. 10 shows an embodiment of the invention which includes a single scanner input 100.

The device shown in FIG. 10 would be used as a scanner for retrofit applications, much like the retrofit terminal described earlier and would interface with existing point of sale hardware via a communications interface 122. Scanner 100 includes a display panel 6, which is preferably a miniature flat panel display, which would also preferably be adjustable to allow the display to be viewed comfortably at different angles. In addition, scanner terminal 100 would include an electronic key insertion slot 120, into which a clerk would insert his or her electronic software key in order to access the system and to link transactions accomplished by each clerk to transaction information at the remote database site, as described earlier. Since this embodiment would receive transaction data from existing point of sale hardware through communications interface 122, which may be a standard, RS 232 communications interface, the scanner 100 itself would not include a complete keypad. However, the scanner terminal 100 would include an accept transaction key 124, which a clerk would depress to indicate that the identity of a patron has been verified. The preferred location of the accept transaction key would be proximate the display, which would help ensure that a clerk looks in the direction of the display in order to locate and depress the accept transaction key 124.

An example of a multi-input scanner is shown in FIG. 11. The embodiment of FIG. 11 includes two scanner input slots 102 and 104. In this embodiment, scanner input 102 is a driver's license or other identification card input and would be physically smaller that scanner input 104, which would accept larger documents, such as checks, store receipts, passports or other larger identification or financial transaction documents.

As can be seen from FIG. 12, a single CMOS chip camera can capture information off of a driver's license, for example, or a check or receipt by utilizing an orientation that takes advantage of different required resolutions for each. For example, a driver's license would include small characters and/or a small photographic image, which would require a high resolution for acceptable image capture. Therefore, the driver's license slot would be oriented close to the CMOS chip camera in order to enhance the resolution. On the other hand, since a check or receipt would typically have larger characters and would not itself include a photographic image, it requires a lower image capture resolution. Therefore, a separate input slot, located further away from the CMOS chip camera, would provide sufficient resolution for acceptable image capture. By selecting a CMOS Camera 110 having a suitable effective aperture and an appropriate lens 106, camera 110 can be configured to provide a depth of field such that images captured from both scanner inputs 102 and 104 will be in focus. Sensors 112 and 114 would sense the insertion of a document in either scanner input slot and would trigger the CMOS camera to capture the image.

Figure 6:
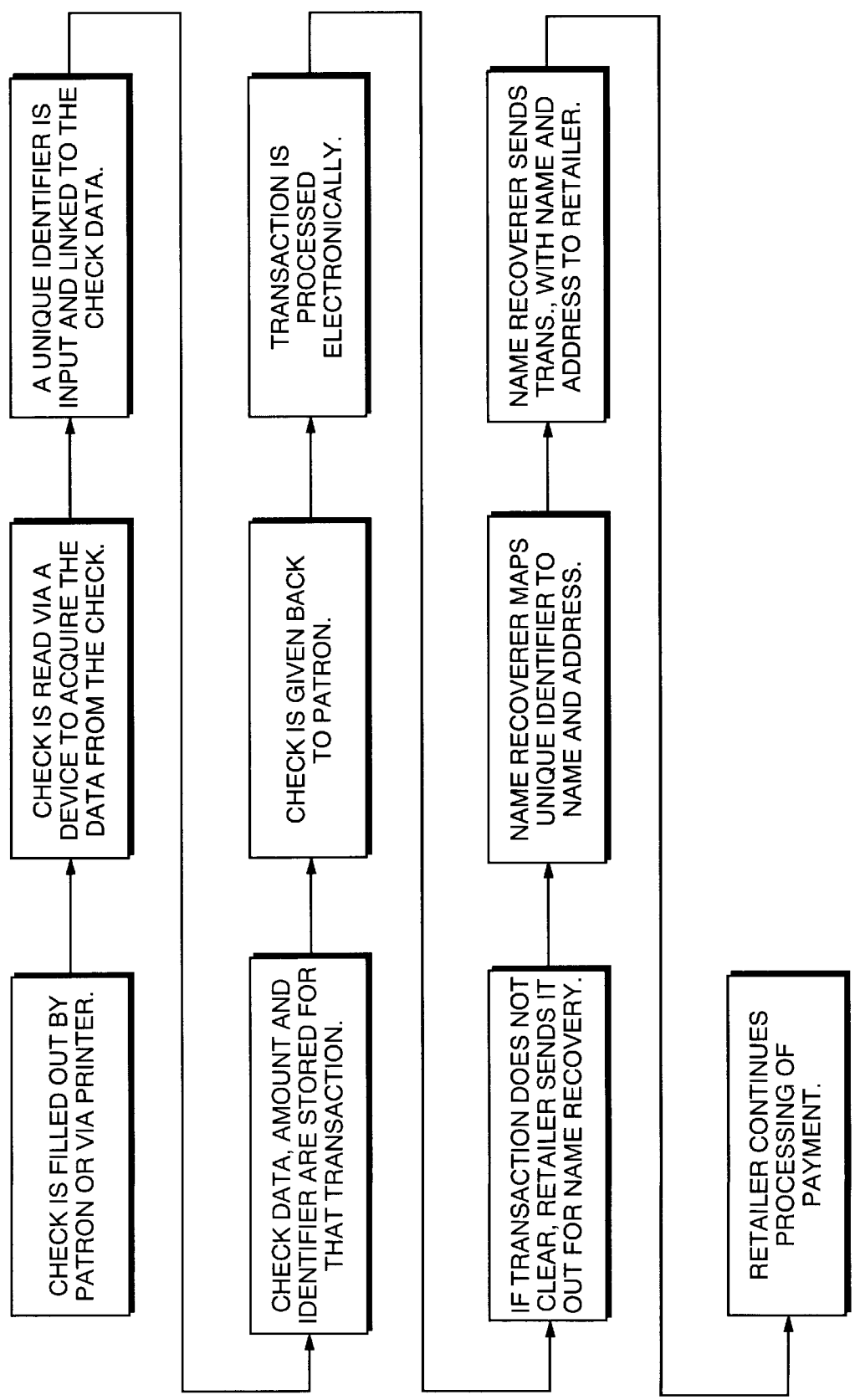
FIG. 6 is a block diagram showing the steps of the method of processing a check-based financial transaction via an EFT along with the steps taken should a particular EFT transaction fail.

Once a check 50 is input into the scanner 100 and the data is read off of the check, the check would be returned to the person tendering such check as payment at the point of sale. At this point, the transaction would be converted to an electronic transaction for payment. The method of the current state of the art in check-initiated electronic funds transfer transactions is more specifically shown in FIG. 6.

This method requires that a check be filled out by a patron either at the point of sale or in advance using handwriting and or other means of printing the required payment information, such as the identity of the payee and the amount of the payment, on the check. The checking account number would then be input into the system either manually or through the use of a scanning device. At this point, the clerk would require the patron to provide a unique identifier to the clerk to be linked to the checking account. The most common unique identifier required is a patron's driver's license number, which would be input into the system and linked to the checking account number. The checking account number, the dollar amount of the check and the unique identifier would then be stored by the system as a check transaction record. The check would then be returned to the patron. The system would then process the transaction electronically as a routine electronic fund transfer (EFT).

So far, this type of check-initiated EFT transaction does not pose any problems to retailers or other merchants. However, if a particular check-initiated, EFT does not clear, the retailer would not be in possession of sufficient data to track down the particular patron who tendered the original check that resulted in the unprocessed or failed EFT. By not retaining the physical check, which would include the tenderer's name, address and other identifying data, the retailer would only have a checking account number and the amount of the failed EFT on hand. Thus, the retailer would be required to send the transaction out for name recovery by an independent agency. The name recovered would then need to map the unique identifier to the name and address of the person tendering the check and return the same to the retailer requesting the information. Only then would the retailer be in a position to continue the processing of the payment by contacting the person who originally tendered the check and requesting an 14 alternative form of payment.

As can be imagined, this process could be time consuming and costly to merchants. However, the disclosed invention would greatly simplify the entire check-initiated EFT payment transaction and virtually eliminate fraudulent check-initiated transactions.

Figure 7:
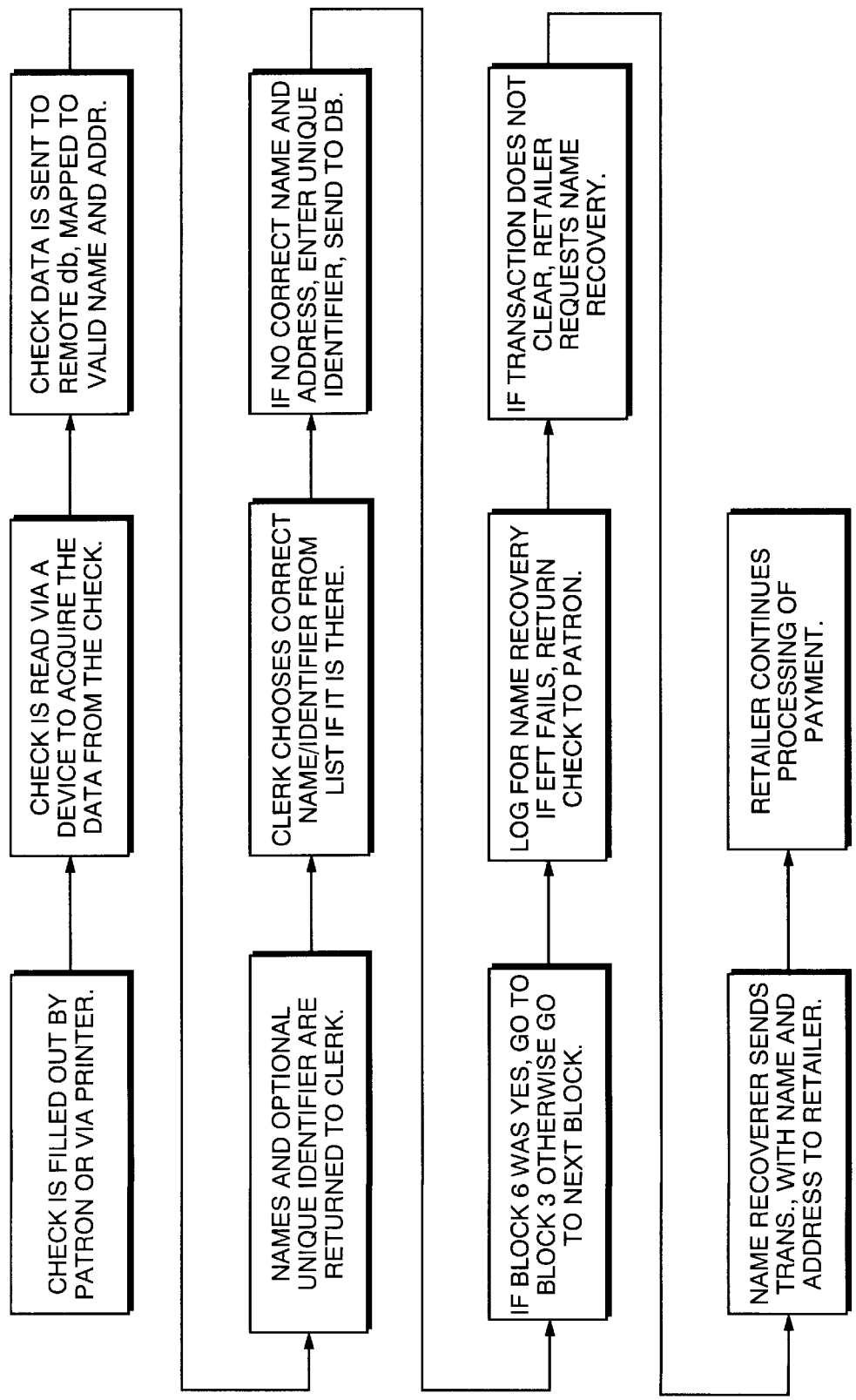
FIG. 7 is a block diagram showing the steps associated with a method of real-time data recovery from data presented on a check and the correlation of said data with data retained in a secure, remote database.

Turning now to FIG. 7, a real-time method of processing check-initiated EFTs, including a real-time method of data recovery and data correlation is shown. In this method, as with the current state of the art, a check or other non-cash financial instrument would be filled out by a patron at the point of sale or in advance. The check or other instrument would then be tendered to a sales clerk at a point of sale location as the payment method for a particular financial transaction. The next step would be to scan the instrument using check scanner 4" in the point of identification terminal 1. The check scanner would thus obtain the relevant information necessary to convert the check-based transaction into an EFT, such as the checking account number, routing information and the like. However, at this point in the transaction, the disclosed system and method would depart from the current state of the art.

In addition to having the capability of reading the checking account and routing information off of the check, the disclosed system would include a check scanner capable of reading other printed information off the face of the check, such as name, address, etc. This may be done either using built-in OCR capabilities or through the use of bit map or other imaging techniques, which could capture an image of a particular check, convert the same into an electronic file, which would then be communicated to the remote database site where it would be resolved using remote OCR technologies resident at the remote database site. In any event, once the account information and other identifying data is read by the check scanner, the point of identification terminal would initiate communications with the secure, remote database described earlier with respect to credit card transactions. Once communications are established, the point of identification terminal would query the remote database and request that the account data be mapped to one or more valid names and addresses authorized to use the checking account in question.

The correlation would be accomplished at the remote database and a name, or list of names, would be retrieved from the database and transmitted to the point of identification terminal. Optionally, the database could send at least one unique identifier for each authorized user of a particular checking account to the point of sale for redundancy of identification purposes. The clerk would then scan the information received at the point of identification terminal and choose the correct name and/or identifier from the list if it is included therein. The choice selected by the clerk would then be transmitted back to the remote database where it would be logged along with the other transaction information as an EFT transaction record. If a particular EFT fails, then the EFT transaction record would be available for recovery by the retailer or other merchant so that the patron initiating the check-based transaction can be located by the retailer so that the retailer can contact said patron in order to continue the processing of the payment.

Figure 8:
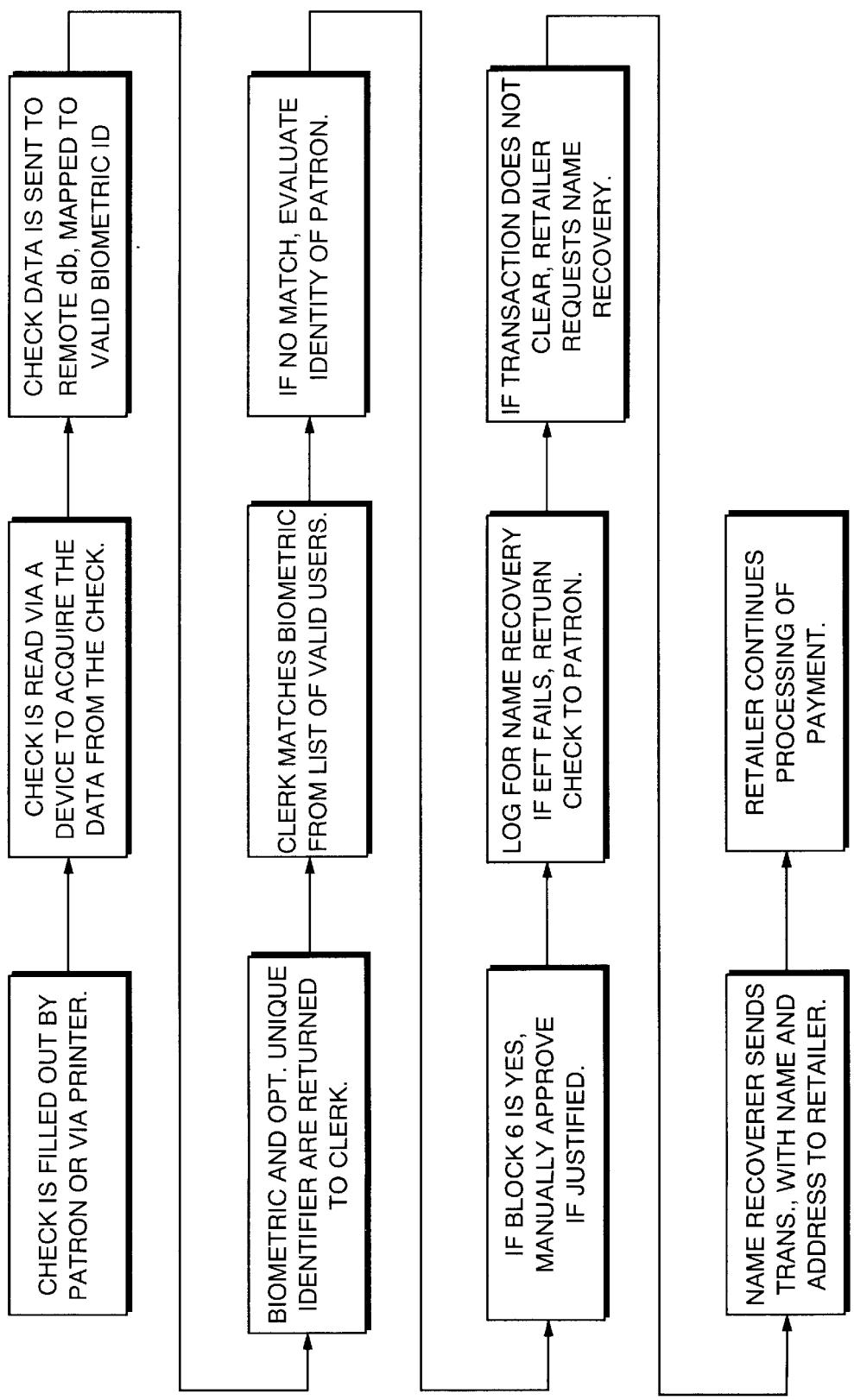
FIG. 8 is a block diagram showing the steps associated with a method of real-time biometric identification and the ability for future data recovery from a secure, remote correlation database.

An even more robust method of real-time check-initiated EFT payment processing is shown in FIG. 8. This method includes real-time biometric identification and the ability for future data recovery from the secure, remote correlation database. In this method, a check or other non-cash financial instrument is presented by a patron and is input into the point of identification terminal by the check scanner as described above. Communications are then established between the point of identification terminal and the remote database site and the checking account data is transmitted to the remote database, where it is mapped to at least one authorized user of the particular checking or other account. The remote database would then search for identifying data associated with the specified account. However, in addition to searching the remote database and retrieving only textual identifying data, such as the names, addresses and other character-based identifying information for authorized users of a specified account, the remote database would include a database of valid biometric identifiers of those authorized users as well. The preferred biometric identifier stored in the remote database is a digital photographic image of each authorized user of an account.

Thus, when the remote database maps a particular account number to a list of authorized users, it not only retrieves a list of names and addresses to transmit to the point of identification terminal but it also retrieves and transmits the biometric identifiers associated with those users to the point of identification terminal. In the case of the digital photographs of the authorized users of an account, each one may be displayed on the display means 6 of the point of identification terminal 1.

The clerk would then scroll through the sequence of digital images and, in the case of photographic images, compare the displayed images with the physical appearance of the person initiating the financial transaction until an image is displayed that matches the physical appearance observed by the clerk at the point of identification. When the clerk matches the biometric data, then identifier-specific data, such as a key sequence is input into the point of identification terminal to indicate that the clerk has verified the identity of the patron. The system would then log the transaction and biometric data at the remote database site as a transaction record for later retrieval if required.

If no correct names and addresses are provided to the point of sale by the remote database, the system would instruct the clerk to request that the person presenting the check provide the clerk with a unique identifier, such as his or her driver's license number. The clerk would then enter the unique identifier associated with the person using the account into the point of identification terminal, which would, in turn, transmit the same to the remote database for storage and future correlation purposes. Furthermore, the clerk would be required to evaluate the identity of the person at the point of identification using prior art practices, such as examining the identifying data presented by the individual. The clerk would then manually approve the transaction if justified.

Figure 9:
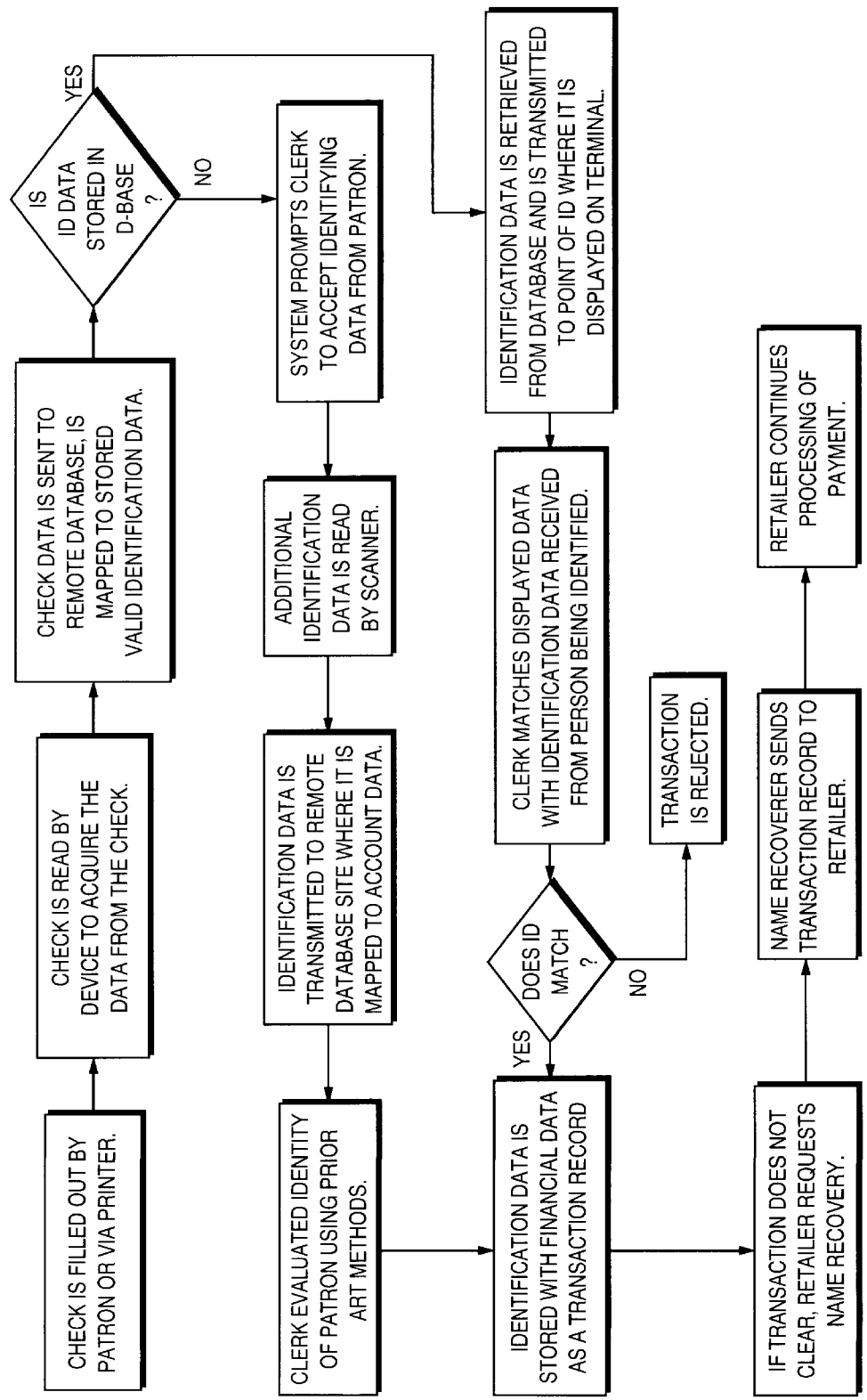
FIG. 9 is a block diagram showing the steps associated with a method of real-time data capture from data presented on multiple instruments to an identifier at a point of identification terminal and the transmission, correlation and storage of said data in a secure, remote database.

FIG. 9 discloses a further method of processing non-cash financial instrument-initiated transactions, which includes the added capability of digital image capture of identification data at the point of identification terminal. Like the method disclosed with respect to FIG. 8, this method includes real-time biometric identification and the ability for future data recovery from the secure, remote correlation database. In this method, a check is presented by a patron at a point of identification as the method of payment for a particular transaction. The check data, which would include the checking account number and other data imprinted on the check is captured by the point of identification terminal using the CMOS camera discussed earlier. The checking account or other account data is then transmitted to the remote database, where the database attempts to retrieve identification data stored in the remote database, which is mapped to the input account data. In the event that the remote database retrieves image data associated with the account, then the remote database transmits the same to the point of identification terminal and the transaction continues in the same way discussed with respect to FIG. 8 above.

However, the method would depart from the earlier described method in the event that the remote database is unable to retrieve any identifying data mapped to the checking account data transmitted to the remote database site. In this case, the system prompts the clerk present at the point of identification terminal to accept additional identification data from the patron and transmit the same to the remote database site. This is accomplished using the same CMOS camera utilized to capture the check data. In the preferred embodiment, the patron's driver's license is inserted into the driver's license slot in the point of identification terminal and the CMOS camera captures a "snapshot" image of the patron's driver's license, which would include both textual identification data, such as the patron's name, address, date of birth, social security number and the like, as well as a photographic image of the patron. The snapshot captured by the point of identification terminal is then transmitted to the remote database site where it is stored as a transaction record for future recall should a particular transaction be questioned at a later date. At the point of identification terminal, the clerk is then tasked with evaluating the identity of the patron using prior art methods. Provided the clerk is convinced that the patron is who the patron purports him or herself to be, then the clerk enters his or her identifier specific data into the point of identification terminal, which is stored as part of the transaction record for later retrieval if required.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A positive identification system especially configured for the collection and display of graphic and textual data in a secure manner, said system comprising:

at least one remote database site having stored therein an identification database including digital photographic images and financial account data associated with persons initiating financial transactions using non-cash financial instruments;

a point of identification terminal including an account data input for accepting financial account data presented by a person initiating a non-cash financial transaction, a display device for displaying said digital photographic images associated with said persons initiating financial transactions using non-cash financial instruments at said point of identification terminal, and a photographic identification card (Photo ID) scanner for scanning at least one digital photographic image from a Photo ID presented by a person initiating said non-cash financial transaction at said point of identification terminal;

a communications link, linking said point of identification terminal with said remote database site to interchange identifying information, financial account data and financial transaction data between the two;

a database server at said remote database site for correlating said financial transaction data with said digital photographic images and financial account data to build transaction records, each said transaction record including financial transaction data associated with a non-cash initiated financial transaction and being mapped to a digital photographic image of said individual initiating said non-cash initiated financial transaction; and a transaction record database for storing said transaction records.

2. The system for efficiently processing financial transactions as claimed in claim 1, wherein said financial account data presented by a person initiating a non-cash financial transaction is a checking account number.

3. The system for efficiently processing financial transactions as claimed in claim 1, wherein said scanner comprises a CMOS camera.

4. The system of claim 1, wherein said scanner comprises a CCD camera.

5. The system of claim 1 further, wherein said point of identification terminal further comprises a terminal controller including an encryption processor for encrypting and decrypting said photo ID, said financial account data and said financial transaction data to provide the secure transmission thereof to and from said remote database site over said communications link.

6. The system of claim 1 wherein said point of identification terminal further comprises a terminal controller including compression processor for compressing and decompressing information to reduce the time required to transmit information to and from said remote database site over said communications link.

7. The system of claim 1, wherein said non-cash financial instrument comprises a credit card and said financial account data comprises a credit card account number.

8. The system of claim 1, wherein said non-cash financial instrument comprises a check and said financial account data comprises a checking account number.

9. A positive identification system especially configured for the collection and display of graphic and textual data in a secure manner, said system comprising:
  at least one remote database site having stored therein a database comprising a plurality of digital photographic images, wherein at least one of said digital photographic images corresponds to an authorized user of a checking account;
  a point of identification terminal including an account data input for accepting a checking account number presented by a person initiating a check-initiated financial transaction, a display panel for displaying said digital photographic images, and a photo identification card (Photo ID) scanner for scanning at least one digital photographic image from a Photo ID presented by a person initiating said check-initiated financial transaction at said point of identification terminal;
  a communications link, linking said point of identification terminal with said remote database site to interchange digital images, checking account data, and financial transaction data between the two;
  a database server at said remote database site for correlating said financial transaction data with said digital photographic images and financial account data to build transaction records; and
  a transaction record database for storing said transaction records.

10. The system of claim 9, wherein said account data input comprises said scanner.

11. A method of positively identifying individuals at a point of identification especially tailored for the collection and display of graphic and textual data in a secure manner, said method comprising the steps of:
  accepting a non-cash financial instrument including an account number from a person initiating a non-cash financial transaction at a point of identification terminal, said point of identification terminal including a display panel for displaying image and textual data and a photographic identification card (Photo ID) scanner for scanning Photo IDs;
  inputting said account number into said point of identification terminal;
  establishing communications between said point of identification terminal and a remote database site, said remote database site having stored therein a database of digital photographic images of persons to be identified, at least one digital photographic image associated with at least one account number;
  transmitting said account number to said remote database site;
  searching said database and retrieving any digital photographic images associated with said account number;
  transmitting any said retrieved digital photographic images to said point of identification terminal, displaying said images on said display panel, comparing said displayed images with the physical appearance of said person initiating said non-cash financial transaction if said images are retrieved, and indicating that the identifier has compared the displayed digital images with the appearance of the person initiating the transaction and that a match exists;
  transmitting a request to scan a Photo ID to the point of identification terminal if no images are retrieved from said image database;
  scanning, using said Photo ID scanner, a Photo ID presented by said person initiating said financial transaction;
  transmitting said scanned Photo ID to said remote database site and storing said Photo ID in an image database;
  storing said account number, financial transaction information and a map to said stored Photo ID at said remote database site as a transaction record in a transaction record database.

12. The method of claim 11, wherein said non-cash financial instrument is a credit card including a credit card account number.

13. The method of claim 11, wherein said non-cash financial instrument is a check including a checking account number.

14. The method of claim 11, wherein said step of indicating that the identifier has compared the displayed digital images with the appearance of the person initiating the transaction and that a match exists comprises inputting identifier specific data into said point of identification terminal.

15. The method of efficiently processing financial transactions as claimed in claim 14, wherein the step of inputting identifier specific data into said point of identification terminal to indicate that the identifier has compared the displayed digital images with the appearance of the person initiating the transaction and that a match exists comprises inserting an identifier specific software key into a software key insertion slot in said terminal and depressing an accept transaction key.

* * * * *